United States Patent [19]

Kreitz

[11] 4,068,551

[45] Jan. 17, 1978

[54] EXTENSION TABLE FOR POWER SAWS

[76] Inventor: Lloyd D. Kreitz, P.O. Box 60, Pequot Lakes, Minn. 56472

[21] Appl. No.: 753,990

[22] Filed: Dec. 27, 1976

[51] Int. Cl.² .............................................. B27B 5/20
[52] U.S. Cl. ..................................... 83/471.3; 83/486; 144/286 R; 144/288 R; 108/48; 108/77
[58] Field of Search .................... 83/471.2, 471.3, 486, 83/856; 144/286 R, 288, 285; 108/48, 77

[56] References Cited

U.S. PATENT DOCUMENTS

| 1,658,826 | 2/1928 | Yerk et al. ...................... 144/286 R |
| 1,767,012 | 6/1930 | Pfau ..................................... 83/471.2 |
| 2,555,217 | 5/1951 | Young .............................. 144/286 R |
| 2,599,096 | 6/1952 | Dirksen ............................ 144/286 R |
| 2,984,132 | 5/1961 | Renz .................................... 144/288 |

Primary Examiner—Donald R. Schran

[57] ABSTRACT

Power saws, e.g., radial arm saws or table saws, are provided with a folding extension table to accommodate comparatively long workpieces. The distal end of the table is supported by folding legs, the proximal end of the table being pivotally connected to one edge of the normal worktable.

9 Claims, 3 Drawing Figures

U.S. Patent  Jan. 17, 1978  4,068,551
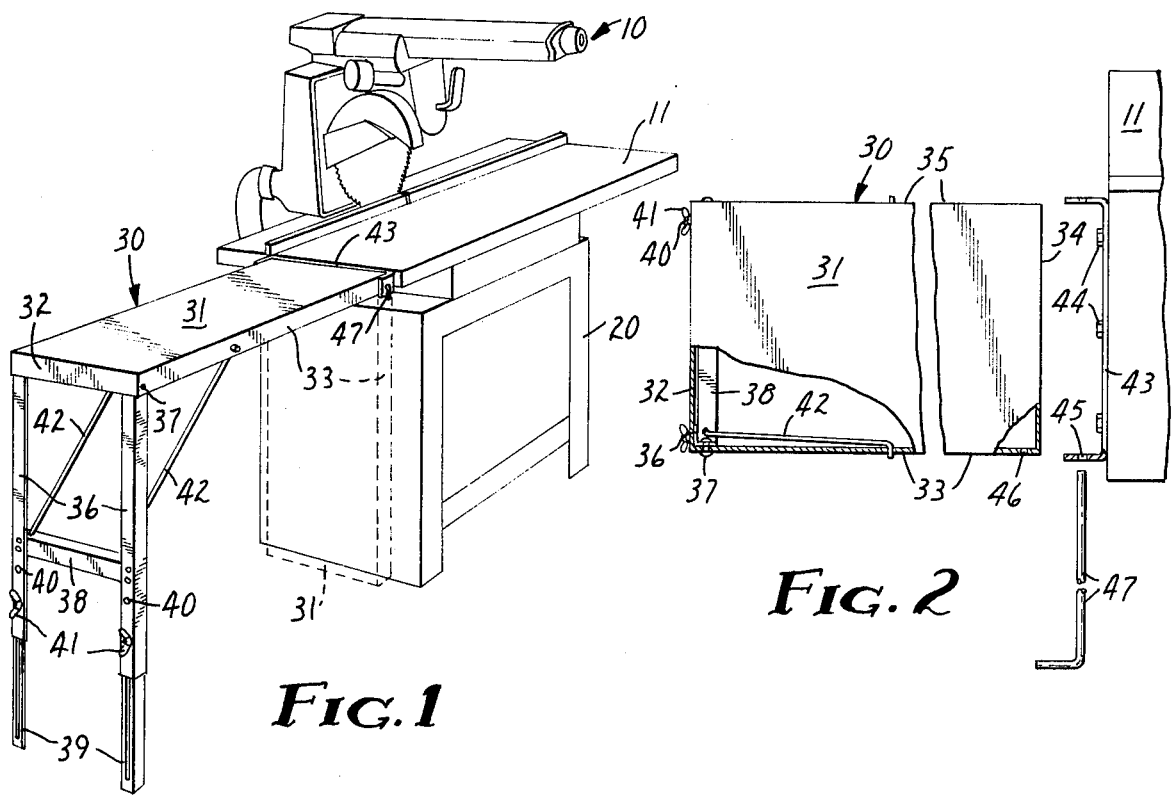
FIG. 1
FIG. 2
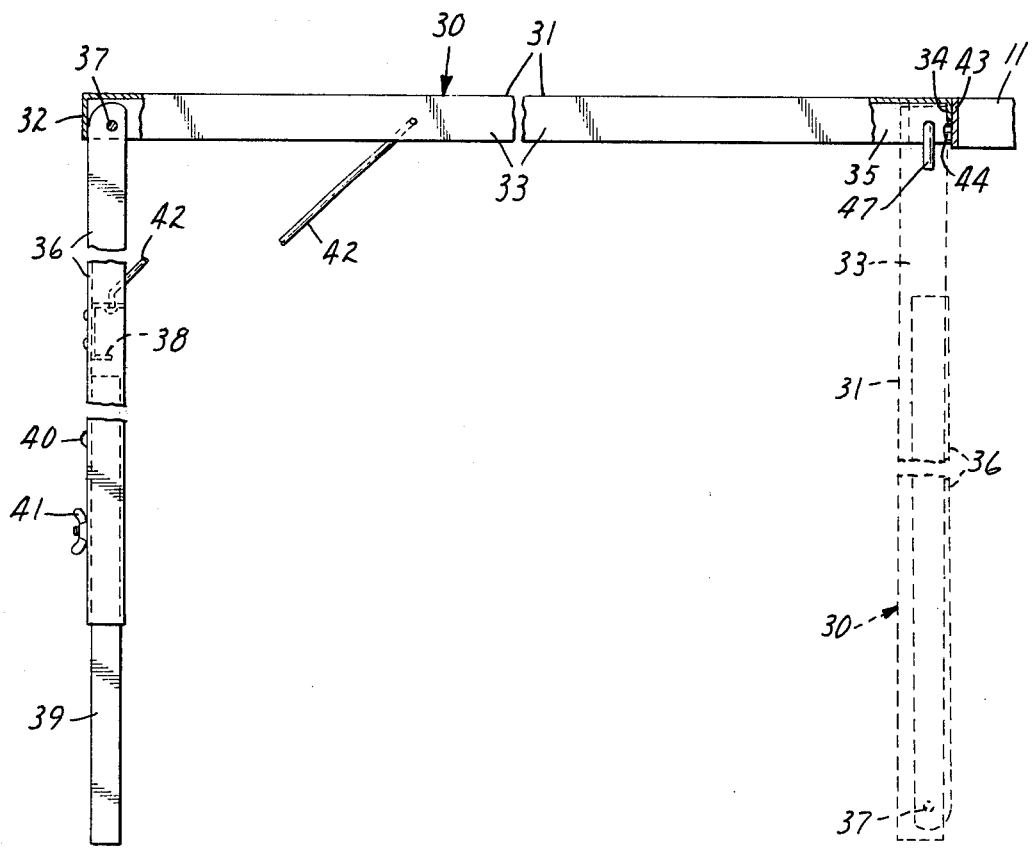
FIG. 3

EXTENSION TABLE FOR POWER SAWS

BACKGROUND OF THE INVENTION

This invention relates to workpiece-supporting tables for power saws.

Table saws and radial arm saws have both been in widespread use for many years. In each tool, the workpiece to be saned is supported by a worktable, a rotating saw blade either extending upwardly through the worktable or being positioned thereover. This arrangement is convenient for most sawing operations, but numerous support problems arise when the workpiece extends very far beyond the edge of the worktable. Not only is such a workpiece hard to hold in position, but the saw cut may also vary from the vertical angle which is intended. In any event, the situation becomes hazardous to the operator, who may be struck by the workpiece or, even worse, be thrown into the saw blade.

To cope with the problems involved in handling oversize workpieces, the manufacturers of table saws have sometimes provided rigid "wings" which can be bolted to the side of the worktable, increasing the area which is available for support. While effective to a degree, these "wings" are heavy and awkward to install or remove, making the saw less convenient for many operations, and increasing the amount of storage space required when the saw is not in use. Even when such "wings" are used, the amount of support is still insufficient for many workpieces.

Radial arm saws, typically having a pressed board worktable, do not allow for the attachment of "wings", at least insofar as I am aware. Further, even if permanently installed extensions could be used with a radial arm saw, the width of the worktable would be substantially increased, making it impractical to move the saw and inconvenient to store it.

Another means previously used for supporting long workpieces is a floor stand having, at its upper end, a yoke in which a workpiece-supporting roller is mounted. This support is useful, but it, too, has limitations. For example, warped or bowed boards do not ride well on the roller. An even more serious problem occurs when the end of the workpiece unexpectedly falls into the gap between the roller and the worktable, twisting the workpiece, changing the angle of cut, and endangering the operator.

In short, prior to my invention, I do not believe that there has ever existed a simple, convenient, light weight extension table for power saws, especially a table which can quickly and easily be brought into position when needed and moved out of the way when it is not required.

SUMMARY

The present invention provides a simple and versatile piece of equipment which can be used in connection with any power saw which has a worktable, providing a convenient extension table for supporting oversize workpieces. The unit provides adequate support for long and/or distorted workpieces, and the risk of having the distal end of a workpiece unexpectedly fall is substantially eliminated.

Expressed in its simplest terms, the extension table of the invention is a folding table which attaches to the side of the standard worktable. Folding legs, or functionally equivalent support means, are provided at the distal end of the extension table, affording stability when the extension is in use. The legs fold under the extension when it is not in use, permitting the extension to be dropped down along the edge of the normal worktable when it is not required.

BRIEF DESCRIPTION OF THE DRAWING

Understanding of the invention will be enhanced by referring to the accompanying drawing, in which like numbers refer to like parts in the several views, and in which:

FIG. 1 is a perspective view of a radial arm saw, showing the folding extension table of the invention in position for use, with dashed lines showing the position assumed by the extension table when it is folded out of the way;

FIG. 2 is an exploded top view of the extension table and the adjacent portion of the normal saw worktable, with certain portions broken away for convenience in visualizing the construction; and FIG. 3 is a front view of the device pictured in FIG. 1, dashed lines again indicating the position assumed by the extension table when it is not in use.

DESCRIPTION OF A PRESENTLY PREFERRED EMBODIMENT

In order to assist in understanding the invention, I will now describe the device shown in the drawings in greater detail. In doing so, I wish to emphasize the fact that, while the invention functions effectively with any type of power saw having a worktable, I will describe it in connection with a radial arm saw for purposes of illustration.

FIG. 1 shows radial arm saw 10, having worktable 11, mounted on base 20, with folding extension table 30 attached to the left edge of worktable 11. Extension table 30 comprises generally rectangular central workpiece-supporting panel 31, from the periphery of which depend distal lip 32, front lip 33, proximal lip 34, and rear lip 35. Conveniently, panel 31 and lips 32 – 35 are formed from a single piece of 16-gauge steel or 63-mil aluminum sheet, depending lips 32 – 35 serving to rigidify panel 31 and reduce any tendency to distort.

Positioned at the distal end of table 30 are legs 36, one of which is rotatably connected to lip 33 by a ¼inch bolt 37 and a self-locking nut (not shown), and the other of which is connected to lip 35 in the same manner. To impart stability to the assembly, legs 36 are connected to each other by cross member 38, which is conveniently formed from channel iron or other suitable material. Slidably attached to the lower ends of legs 36 are slotted extension members 39, bolt 40 and self-locking nut (not shown) combining with thumb screw 41 to permit adjustment of the overall leg length to conform to variations in floor contour and provide a height which corresponds to that of worktable 11. Legs 36 and extension members 39 are both conveniently made from 16-gauge angle iron or 90mil aluminum. The upper ends of legs 36 are preferably rounded to facilitate rotation about bolt 37 without becoming wedged against either lip 32 or the lower survace of panel 31.

It is extremely desirable to provide some type of rigidifying means which will insure that legs 36 remain in fixed position when table 30 is in use. While numerous arrangements will accomplish this objective, one simple and effective way is shown in the drawing. Brace 42, formed from a headed and bent piece of 3/16-inch steel rod, is inserted upwardly through a hole in cross member 38 adjacent one of the legs 36, extending vertically and diagonally inwardly and upwardly. At its distal end, brace 42 is provided with a right-angle terminal stub which extends outwardly and is inserted through a correspondingly located hole in lip 33 or lip 35, as appropriate.

The manner in which extension table 30 is hingedly connected to worktable 11 will now be described.

Generally C-shaped mounting bracket 43 is attached to the edge of worktable 11 by means of bolts or screws 44 as appropriate. In each of the two horizontally and leftwardly extending arms of bracket 43 is a hole 45, the arms being spaced from each other a distance which is just slightly greater than the width of table 30. Located in the proximal ends of lips 33 and 35 are holes 46. To connect table 30 to worktable 11, the proximal end of table 30 is inserted between the arms of bracket 43 so that holes 45 and 46 are aligned. Pintle 47 is then inserted through all four holes (45, 46, 46, 45), so that the portion of bracket 43 surrounding holes 45 functions as a gudgeon.

Although extension table 30 can be attached to or removed from worktable 11 by simply inserting or removing pintle 47, it is convenient to leave the two tables (11, 30) permanently connected. At such time as extension table is not required, it can be conveniently folded out of the way. To fold table 30 in this manner, the distal ends of braces 42 are first removed from the holes in lips 33 and 35. Legs 36 are then pivoted upward under panel 31, and the entire assembly is rotated about pintle 47 to a vertical position adjacent saw base 20. Obviously, the length of panel 31 cannot exceed the height of worktable 11 above the floor for extension table 30 to be folded and stored in this manner.

As previously indicated, the foregoing description is only illustrative, and numerous mechanical variations of the device shown and described will readily occur to those with ordinary skill in the use of power saws. To illustrate, legs 36 and extensions 39 can be formed of telescoping tubular metal, other forms of brace 42 can be utilized, additional means of rigidifying panel 31 can be employed, etc.

What I claim is as follows:

1. In combination with a power saw of the type comprising a generally rectangular flat-topped horizontal worktable supported a fixed distance above a floor and a driven blade associatively connected thereto for cutting a workpiece supported thereon, a generally C-shaped horizontally disposed mounting bracket connected to a lateral edge of the worktable slightly below the upper surface thereof, said bracket terminating in a pair of horizontally spaced arms, each containing a hole functioning as a gudgeon, a generally rectangular, flat-topped extension table comprising an elongate flat panel having lips depending from each of the longer sides thereof, the length of said longer sides being slightly less than the distance said gudgeons are above the floor, the length of the shorter sides of said extension table being slightly less than the distance between said gudgeons, the proximal end of said extension table being positioned between said gudgeons, a pintle extending through said lips and said gudgeons, said extension table being rotatable about said gudgeons to assume a horizontal, laterally extending position closely approximating the lateral edge of the worktable and substantially coplanar therewith when said extension table is in use and a vertical, downwardly extending position adjacent the lateral edge of said worktable when said extension table is not in use, said extension table being readily detachable from said worktable by removing the pintle from said gudgeons, a pair of legs, each located between said lips and hingedly connected thereto at the distal end of said extension table to permit said legs to support said distal end when the extension table is in use and to fold thereunder when said extension table is in stored position.

2. The invention of claim 1 wherein a lip extends downwardly from each edge of said elongate flat panel to enhance its resistance to twisting and distortion.

3. The invention of claim 2 wherein the flat panel and depending lips are formed from a single piece of sheet metal.

4. The invention of claim 3 wherein the pair of legs is connected by a cross-member at an intermediate location, thereby imparting greater stability.

5. The invention of claim 4 wherein at least one of the legs is provided with a rigidifying means which maintains said legs in fixed angular relationship to the flat panel when the extension table is in use.

6. The invention of claim 5 wherein the rigidifying means is a brace extending from the cross member to one of said lips.

7. The invention of claim 6 wherein a brace extends from the cross member to each of the two lips depending from the longer sides of said elongate flat panel.

8. The invention of claim 7 wherein the legs are adjustable in length to accommodate differing heights of power saw and varying floor conformation.

9. The invention of claim 8 wherein each leg is formed of two pieces of angle iron, connected with bolts, one of said pieces being slotted to provide means for adjustment.

* * * * *